United States Patent [19]

Hardison

[11] Patent Number: 5,139,753
[45] Date of Patent: * Aug. 18, 1992

[54] CONTINUOUS PROCESS FOR MASS TRANSFER OF A LIQUID REAGENT WITH TWO DIFFERENT GASES

[75] Inventor: Leslie C. Hardison, Barrington, Ill.

[73] Assignee: ARI Technologies, Inc., Palatine, Ill.

[ * ] Notice: The portion of the term of this patent subsequent to Jun. 30, 2009 has been disclaimed.

[21] Appl. No.: 682,546

[22] Filed: Apr. 8, 1991

[51] Int. Cl.$^5$ .............................................. C01B 17/16
[52] U.S. Cl. ................................ 423/220; 423/230; 423/231; 423/573.1; 423/576.4; 422/199
[58] Field of Search ............... 423/576.2, 576.4, 576.5, 423/576.6, 576.8, 573.1, 220, 230, 231; 422/191, 193, 194, 169

[56] References Cited

U.S. PATENT DOCUMENTS

| | | | |
|---|---|---|---|
| 2,142,406 | 1/1939 | Nonhebel et al. | 422/169 |
| 3,638,708 | 2/1972 | Farin | 159/47 WL |
| 3,759,669 | 9/1973 | Aaron et al. | 422/231 |
| 3,876,537 | 4/1975 | Dulin et al. | 210/15 |
| 3,887,682 | 6/1975 | Kumata et al. | 423/232 |
| 4,009,251 | 2/1977 | Meuly | 423/573 G |
| 4,083,944 | 4/1978 | Chalmers | 423/567 A |
| 4,225,562 | 9/1980 | Anderson | 422/188 |
| 4,236,974 | 12/1980 | Kuhnlein | 203/11 |
| 4,238,462 | 12/1980 | Hardison | 423/224 |
| 4,375,450 | 3/1983 | Katagiri et al. | 422/170 |
| 4,482,524 | 11/1984 | Hardison | 422/170 |
| 4,622,212 | 11/1986 | McManus et al. | 423/226 |
| 4,844,881 | 7/1989 | Gens et al. | 423/574 R |
| 4,855,124 | 8/1989 | Matsuoka et al. | 423/547 L |
| 4,935,221 | 6/1990 | Bronfenbrenner et al. | 423/574 |
| 4,976,935 | 12/1990 | Lynn | 423/222 |

FOREIGN PATENT DOCUMENTS

| | | | |
|---|---|---|---|
| 54-39383 | 3/1979 | Japan | 422/194 |
| 1298861 | 12/1972 | United Kingdom | 423/567 A |

OTHER PUBLICATIONS

Leslie C. Hardison, "Hydrogen Sulfide: An Alternative To Claus", Chemical Engineering, Jan. 21, 1985.

Primary Examiner—Gary P. Straub
Assistant Examiner—Timothy C. Vanoy
Attorney, Agent, or Firm—Marshall, O'Toole, Gerstein, Murray & Bicknell

[57] ABSTRACT

A method and apparatus for removing $H_2S$ from a process gas, including a reaction chamber between an absorption chamber and an oxidizer chamber, in the polyvalent metal redox catalyzed removal of $H_2S$ from a process gas. The process and apparatus of the present invention inclues a first gas-liquid mass transfer zone or absorber chamber for intimately containing an $H_2S$-containing process gas with an oxidized polyvalent metal redox solution for absorption of the $H_2S$; and a reaction chamber in fluid communication with polyvalent metal redox solution exiting the absorption chamber through a valve-controlled cross-flow conduit. Cross flow of solution from the absorber chamber through a valve or other circulation control device to the reaction chamber provides controlled, continuous and sequential gas-liquid contact with two or more different gases in separate absorption, reaction and oxygenation zones within a single or multiple vessels.

21 Claims, 3 Drawing Sheets

CONTINUOUS PROCESS FOR MASS TRANSFER OF A LIQUID REAGENT WITH TWO DIFFERENT GASES

FIELD OF THE INVENTION

The present invention is directed to a method and apparatus for selectively removing H₂S gas from a process gas stream using a polyvalent metal redox catalyst solution, such as an iron chelate absorption solution, e.g., the ARI Technologies Inc. LO-CAT ® solution, or a metal vanadate-containing absorption solution together with an anthraquinone disulfonate (ADA), such as that used in the Stretford process, to react the H₂S gas selectively from the process gas stream to form elemental sulfur. More particularly, the present invention is directed to a method and apparatus for removing H₂S from a process gas using a catalytic metal redox absorption solution at a relatively high pH and at a relatively low metal redox solution concentration substantially without the formation of thiosulfate ($S_2O_3^=$). The process and apparatus of the present invention are adaptable to any H₂S removal process that uses a polyvalent metal redox solution in two valence states for absorption of H₂S, with or without other impurities, and regeneration of the polyvalent metal redox solution.

BACKGROUND OF THE INVENTION AND PRIOR ART

Two of the most widely used processes for removal of H₂S from process gas streams are the catalytic processes that use 1) an iron chelate catalytic absorption solution, e.g., LO-CAT ®, and 2) a metal vanadate chelated catalytic absorption solution, e.g., the Stretford Process. The oxidation-reduction reactions that permit these processes to be carried out continuously are well known to those skilled in the H₂S removal art and are well documented in the literature. The ferric iron chelate-H₂S reactions can be represented as follows:

$$H_2S(gas) + H_2O(Liquid) \rightleftharpoons H_2S(aqueous) + H_2O(Liquid)$$

$$H_2S(aqueous) \rightleftharpoons H^+ + HS^-$$

$$HS^- \rightleftharpoons H^+ + S^=$$

By combining these equations, the resulting equation is:

In order to have an economical, workable process to effect catalytic oxidation of the hydrogen sulfide using an iron chelate redox solution, it is essential that the hydrogen sulfide gas be brought continuously into intimate contact with the chelated iron solution and that the ferrous iron chelate formed in the above described manner be continuously regenerated by oxidizing to ferric iron chelate by intimate contact with dissolved oxygen, preferably in the form of ambient air. The series of reactions that take place when regenerating the required ferric iron chelate can be represented by the following equations:

By combining these equations, the resulting equation is:

The economics and workability of the Stretford process have depended upon a large volume of the metal vanadate redox solution, and that the reduced metal vanadate, after absorption of the H₂S (as HS⁻ or S⁼) to form the metal vanadate in the +4 valance state is continuously regenerated to the +5 valance state by contact with dissolved oxygen for further use of the oxidized metal vanadate in the absorption zone to remove additional H₂S as elemental sulfur. The Stretford process chemistry is typically summarized according to the following steps:

Absorption and dissociation of H₂S into alkali:

$$2H_2S(g) + 2Na_2CO_3 \rightarrow 2NaHS + 2NaHCO_3;$$

Bisulfide oxidation with metal vanadate to form elemental sulfur and reduced vanadium:

$$2NaHS + 4NaVO_3 + H_2O \rightarrow Na_2V_4O_9 + 4NaOH + 2S; \text{ and}$$

Vanadium reoxidation by dissolved molecular oxygen in the presence of ADA:

Prior to the method and apparatus disclosed in my U.S. Pat. No. 4,238,462, the catalytic oxidation-reduction reactions for continuously removing hydrogen sulfide, or the like, from a fluid stream were carried out concurrently in the same reaction vessel by means of a process which can be referred to as an aerobic operation, or by means of a process in which the oxidation and reduction steps were carried out in separate reaction vessels in what can be referred to as an anaerobic operation (see U.S. Pat. No. 3,897,219). While an anaerobic operation may have certain advantages over an aerobic operation for treating some gas streams which must be recovered after H₂S removal, there is the extra expense involved in providing additional equipment, and the continuous pumping of large volumes of liquid from one vessel to the other increases operating costs.

The method and apparatus described in my U.S. Pat. No. 4,238,462 provides a means for accomplishing an essentially anaerobic process for carrying out the oxidation of H₂S in which the absorption and oxidation processes are carried out in separate volumes within a single vessel with the solution circulation from one contact zone to the other by means of solution density differences induced by the oxidation air flow. This apparatus and process have been commercially successful, but the commercial use of that method and apparatus suffers from several disadvantages including some lack of control of residence time for gas-liquid contact in each of the reaction zones; no provision for liquid flow control; a relatively high thiosulfate production rate—4 to 6 percent by weight of the sulfur being converted to thiosulfate; and relatively high iron losses when the method and apparatus are used in the preferred embodiment for polyvalent metal redox solution removal of hydrogen sulfide gas from a fluid stream.

Further, one skilled in the art will see that the autocirculation process as practiced commercially (U.S. Pat. No. 4,238,462) comprises a well-stirred oxidation section, in which the composition of the bulk of the solution in the oxidizer is of necessity substantially the same as that circulating into the absorption zone. That is, it is nearly completely oxidized, so has a relatively high oxygen partial pressure and presents a minimum driving force for dissolution of oxygen in the solution.

It is evident from the foregoing equations that theoretically two moles of chelated ferric iron or $V^{+5}$ redox solution must be supplied to the reaction (absorption) zone in which the hydrogen sulfide gas is oxidized to form elemental sulfur for each mole of hydrogen sulfide gas treated, and in actual practice considerably more than the theoretical amount of iron chelate or $V^{+5}$ redox solutions are used. In a continuous process of removing hydrogen sulfide by contact with a catalytic ferric iron chelate solution or a catalytic vanadate ($V^{+5}$) solution, the catalytic solution is circulated continuously between an absorber zone, where the $H_2S$ is absorbed by the catalytic ferric iron chelate or vanadate ($V^{+5}$) solution, and the solution reduced to ferrous iron chelate or $V^{+4}$; and an oxidizer zone where the ferrous iron chelate solution or reduced $V^{+4}$ solution is oxidized back to the ferric iron or $V^{+5}$ state. Accordingly, either high concentrations of iron chelate or metal vanadate is employed in the catalytic solution, or the rate of circulation has been high to assure that sufficient catalytic metal is present for substantially complete absorption of the $H_2S$ (as $HS^-$ and $S^=$).

A great many prior art patents are directed to the removal of $H_2S$ using catalytic polyvalent metal redox solutions, such as an iron chelate or a metal vanadate. Examples of the prior art patents directed to the use of polyvalent metal redox solution for $H_2S$ removal include the following: Hartley, et al. U.S. Pat. No. 3,068,065; Sibeud, et al. U.S. Pat. No. 3,897,219; Salemme U.S. Pat. No. 3,933,993 Meuly U.S. Pat. No. 4,009,251; Mancini, et al. U.S. Pat. No. 4,011,304; Thompson U.S. Pat. No. 4,189,462; Hardison U.S. Pat. No. 4,238,462, Blytas, et al. U.S. Pat. No. 4,356,155; Hardison U.S. Pat. No. 4,482,524; McManus, et al. U.S. Pat. No. 4,622,212; Primack, et al. U.S. Pat. No. 4,455,287; Fong, et al. U.S. Pat. No. 4,664,902 and U.S. Pat. No. 4,705,676.

One of the most significant problems in the removal of $H_2S$ gas using a catalyzed polyvalent metal redox solution, particularly either an iron chelate redox absorption solution or a vanadium redox absortion solution, is that the efficiency of the redox reactions required of polyvalent metal redox solutions is somewhat pH dependent It is well known that polyvalent metal redox solutions are capable of solubilizing the contaminant metal ions at a pH well above pH 7, but the speed of the redox reactions decreases substantially with decreasing pH, despite statements in issued patents to the effect that a broad range of pH is acceptable—e.g., see Hartley U.S. Pat. No. 3,068,065; Pitts, Jr., et al. U.S. Pat. No. 3,097,925; Meuly, et al. U.S. Pat. No. 3,226,320; Roberts, et al. U.S. Pat. No. 3,622,273. Others have recognized that periodic addition of alkali is needed to maintain a suitably high pH for redox reaction efficiency—e.g., see Roberts, et al. U.S. Pat. No. 3,622,273, since the pH tends to drop as the reactions proceed.

As described in the Meuly U.S. Pat. No. 4,009,251, it is recognized that the pH of polyvalent metal redox solutions is lowered during the $H_2S$ removal (absorption) redox reactions because of side reactions between the dissolved forms of $H_2S$ and oxygen resulting in formation of acidic salts. As recognized in the Meuly U.S. Pat. No. 4,009,251, these acidic side reaction products are for the most part oxides of sulfur represented by the formula $S_xO_y$, where x is generally 1 or 2; and y is generally 2 or 3, that are present in an alkali-containing redox solution as sulfites, sulfates and thiosulfates.

The acidic salts that are formed in the polyvalent metal catalytic redox solution as a result of the reactions between dissolved forms of $H_2S$ with oxygen in the oxidation zone to produce $S_2O_3^=$ and $SO_4^=$ are formed at a higher rate at higher pH levels, particularly at pH levels significantly above 7. Accordingly, the higher the pH, the more frequent it is necessary to add alkali periodically. As a result of the acidic salt formation in the redox solution, a periodic "blowdown" of polyvalent metal redox solution is required (a term used to denote the irretrievable discarding of some or all of the polyvalent metal redox solution and replacement with fresh, non salt-contaminated solution). Since the polyvalent metal redox solutions are relatively expensive, the efficiency of the redox reactions catalyzed by polyvalent metal redox solutions at a relatively high pH must be balanced by the expense of the addition of alkali and the expense of lost solution because of "blowdown" being necessary periodically to maintain acidic salt concentration in the redox solution below an acceptable upper limit. Further, the acidic sulfur salts formed during $H_2S$ absorption necessarily reduce the elemental sulfur yield from the $H_2S$ removal process.

One method disclosed useful to substantially inhibit salt formation in a polyvalent metal redox solution in a process for the catalytic removal of $H_2S$ from a process gas is disclosed in the Meuly U.S. Pat. No. 4,009,251, using particular polyvalent metal chelating agents to inhibit oxidation of sulfur beyond elemental sulfur. In accordance with the present invention, it has been found that thiosulfate concentration in the polyvalent metal redox catalytic solution can be controlled with a minimum of loss of polyvalent metal catalyst while reducing the size and cost of the equipment necessary for removing $H_2S$ from both low pressure and high pressure gas streams.

In accordance with the process and apparatus of the present invention, the reduced solution from the absorption chamber is allowed to react in a reaction chamber prior to oxygenation in the oxidizer zones, giving sulfur and optionally, sulfides and polysulfides time to form before exposing the $H_2S$-laden polyvalent metal redox solution to oxygen, thereby substantially eliminating the formation of thiosulfates. As shown in the drawings, the sulfur can be removed from the process at the reaction chamber, or from any of the oxidizer stages, as desired. Removal from the last oxidation stage, containing the most oxidized polyvalent metal (e.g., $Fe^{+3}$ or $V^{+5}$) and the least amount of $HS^-$ and $S^=$, will lessen the formation of polyvalent metal-sulfur compounds when the sulfur/polyvalent metal redox solution slurry is fed to a sulfur melter in a later stage of the process. Further, the quantity of oxygen dispersed in a last oxidation stage can be controlled to prevent a substantial excess of dissolved oxygen in the polyvalent metal redox solution entering the absorption stage of the process so that thiosulfate and other acidic salts will be formed in the absorption zone of the process to a much lesser extent, enabling the process to be carried out at a more efficient, higher pH with little or no need for periodic addition of alkali to the polyvalent metal redox solution.

SUMMARY OF THE INVENTION

The above and other disadvantages have been overcome in accordance with the method and apparatus of the present invention by providing a reaction chamber between an absorption chamber or zone and an oxidizer chamber or zone in the polyvalent metal redox catalyzed removal of $H_2S$ from a process gas. The process and apparatus of the present invention includes a first gas-liquid mass transfer zone or absorber chamber for intimately contacting an $H_2S$-containing process gas with an oxidized polyvalent metal redox solution for absorption of the $H_2S$; and a reaction chamber in fluid communication with polyvalent metal redox solution exiting the absorption chamber through a valve-controlled cross-flow conduit. Cross flow of solution from the absorber chamber through a valve or other circulation control device to the reaction chamber provides controlled, continuous and sequential gas-liquid contact with two or more different gases in separate absorption, reaction and oxygenation zones within a single or multiple vessels.

Each of the absorber and oxidizer gas-liquid mass transfer zones or chambers may be divided into two or more separate contact stages for continued gas-liquid contact. The separate stages of each gas-liquid mass transfer zone or chamber are in sequential fluid communication, one with another. In one embodiment, the reaction chamber separates the absorber gas-liquid mass transfer zone from the oxidizer gas-liquid mass transfer zone, in a single vessel, to provide controlled reaction time and controlled circulation of solution between the absorber and the oxidizer for sequential contact with a different gas in each zone and complete sulfur separation. Reliable, controlled circulation of polyvalent metal redox solution from the absorber to the reaction chamber is achieved ragardless of the desired rate of flow of the process gas in the absorber or the desired rate of oxygen flow in the oxidizer stage(s). In the application to liquid redox processes for oxidation of $H_2S$ to sulfur and water, there is little or no thiosulfate production since elemental sulfur is formed in the reaction chamber or in the cross flow conduit prior to oxidation of $HS^-$ and $S^=$ ions, mostly occurring in the final oxidation stage, and due to the ability to control the dissolved oxygen in the polyvalent metal redox solution entering the absorption chamber; and the absorber and/or oxidizer gas-liquid mass transfer zones can be separated into stages to minimize the total volume required for each mass transfer zone.

Further advantages over the method and apparatus set forth in U.S. Pat. No. 4,238,462 include ease of segregation of the various gases. In the liquid redox $H_2S$ oxidation process, spent air and spent process gases are separated so that the $CO_2$ content of a clean process gas can, when economically feasible, be recovered, thereby minimizing the amount of spent air that is combined with sour process gas needing scrubbing or incineration; and there can be a substantial pressure difference between the various gas-liquid contact chambers to accommodate pressure requirements of downstream processing equipment.

There is a further advantage which may be significant in terms of application to other chemical systems. With the method and apparatus of the present invention, the Stretford process, or any other mass transfer process requiring liquid contact with two or more different gases can be used, such as Shafer, Unisulf, and the like, or any other gas-liquid contact mass transfer process that requires substantial residence time.

In accordance with another important feature of the present invention, it has been found that acidic salt (particularly thiosulfate) formation can be avoided or substantially reduced in an absorption zone of the process and apparatus of the present invention, operated at a pH above 7, even as high as about 8 to about 9.5 or 10, so long as the polyvalent metal redox solution is sufficiently dilute in the absorption zone such that the redox solution provides less than the stoichiometric quantity of polyvalent metal required for complete reaction with the $H_2S$ from the process gas, and the pH is at a level of at least about 8.0, and preferably in the range of about 8.5 to about 9.5. To achieve the full advantage of the present invention, the quantity and flow rate of polyvalent metal redox solution in the absorber chamber should be such that 50% or less of the stoichiometric quantity of polyvalent metal redox solution is present in the absorption zone of the process, and preferably about 25% or less of the stochiometric quantity of polyvalent metal chelate necessary for complete $H_2S$ reaction in the absorption zone. Excellent control over the sub-stoichiometric amount of polyvalent metal redox solution within the absorber is achieved by recirculating redox solution from the oxidizer back to the reaction chamber before it reaches the absorber.

Quite surprisingly, it has been found that the above-described sub-stoichiometric quantity of polyvalent metal redox solution will provide essentially complete sulfur recovery, without a substantial quantity of acidic salts being formed in the absorption zone of the process and apparatus and without precipitation of the polyvalent metal-sulfur compounds, e.g., polyvalent metal sulfides, so long as the pH of the polyvalent metal redox solution is maintained at a level of at least about 8.0; the concentration and flow rate of the polyvalent metal redox solution, in relation to concentration and flow rate of $H_2S$ in the process gas, is less than the theoretical quantity needed for complete $H_2S$ ($HS^-$ and $S^=$) reaction; and the polyvalent metal redox solution is permitted sufficient residence time in a reaction chamber for complete sulfide ($HS^-$) and polysulfide ($S^=$) conversion to sulfur by contact with ferric ion, before reoxidation of ferrous ion in an oxidizer zone of the process.

Contact times in the reaction chamber on the order of about 15 seconds are sufficient to essentially prevent the formation of thiosulfates ($S_2O_3^=$). Accordingly, substantially complete elimination of thiosulfate is achieved in accordance with the process and apparatus of the present invention. The concentration and flow rate of the polyvalent metal redox solution easily can be calculated by considering the concentration of polyvalent metal in the redox solution, the flow rate of redox solution relative to flow rate of process gas, and the $H_2S$ concentration in the process gas.

In this manner, in accordance with a new and unexpected feature of the method and apparatus of the present invention, the flow rate of polyvalent metal redox solution through the absorber chamber can be substantially lower than for prior art polyvalent metal redox removal processes and apparatus since significantly less polyvalent metal redox solution is required in the absorption zone for complete H₂S absorption; and the lower, but effective quantity of polyvalent metal redox solution and high alkalinity of the redox solution substantially prevents the formation of elemental sulfur or a polyvalent metal-sulfur reaction product in the absorber so long as the solution is sufficiently alkaline to absorb essentially all of the HS⁻ and S⁼ ions. Further, the circulation rate between the absorption chamber and the reaction chamber, and thereafter the first stage of the oxidizer chamber, can be controlled to limit the amount of dissolved oxygen, thereby minimizing the amount of thiosulfate formed, and decreasing the need for periodic alkali addition, thereby avoiding a buildup of acidic salts in the polyvalent metal redox solution. Accordingly, polyvalent metal redox solution losses are minimized.

The reactions in the absorber of the H₂S removal process of the present invention, where the pH is above 7, and at the above-described theoretically sub-stoichiometric quantity of polyvalent metal chelate, for example, using a catalytic iron chelate redox solution, are as follows:

The resultant absorber solution contains a large excess of sodium hydrosulfide and, for an iron chelate solution, the original chelating agents, and, by allowing residence time in the reaction chamber sufficient for complete HS⁻ and S⁼ conversion to sulfur prior to oxidation, thiosulfate ($S_2O_3^=$) production and polyvalent metal losses are minimized.

Accordingly, one aspect of the present invention is to provide a method and apparatus for causing mass transfer between a liquid and a plurality of different gases or gases within separate mass transfer zones within a single vessel.

Another aspect of the present invention is to provide a method and apparatus for continuously removing hydrogen sulfide (H₂S) gas from a process gas stream by intimate contact with a catalytic polyvalent metal redox solution in one mass transfer zone and continuously regenerating the catalytic solution within the same vessel by intimate contact with an oxidizing gas in a separate mass transfer zone.

Another aspect of the present invention is to provide method and apparatus for continuously removing hydrogen sulfide (H₂S) gas from a sour process gas stream without conversion of the H₂S to significant levels of thiosulfate, e.g., metal thiosulfate salts, such as Na₂S₂O₃, generally less than about 5% by weight of the sulfur converted to thiosulfate, and preferably less than 1% by weight.

Still another aspect of the present invention is to provide a method and apparatus for continuously removing hydrogen sulfide (H₂S) from an H₂S containing process gas by intimate contact of the process gas with a polyvalent metal redox catalyst solution in an absorber mass transfer zone for absorption of the H₂S gas into the catalyst solution, and regenerating the polyvalent metal redox catalyst solution in a separate oxidative mass transfer zone in the same vessel, while providing a reaction chamber between the two mass transfer zones and liquid flow control between the absorption zone and the reaction chamber.

BRIEF DESCRIPTION OF THE DRAWINGS

The above and other aspects and advantages of the present invention will become more apparent from the following detailed description of the preferred embodiments taken in conjuntion with the drawings wherein.

DETAILED DESCRIPTION OF THE PREFERRED EMBODIMENTS

Figure 1:
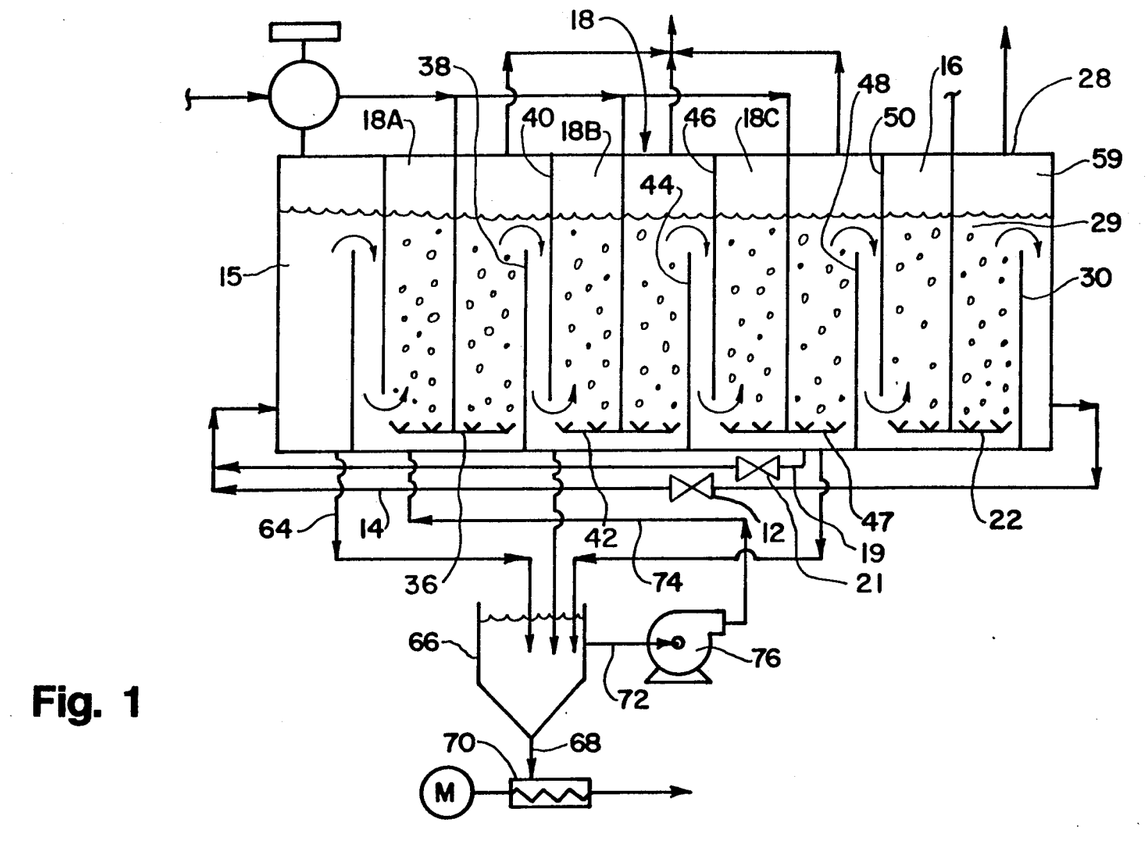
FIG. 1 is a schematic side view of one embodiment of the gas-liquid mass transfer oxidizer/absorber vessel of the present invention, including a sulfur recovery vessel, used in the polyvalent metal redox process and apparatus of the present invention for use with any polyvalent metal redox solution, particularly an iron chelate solution or a metal vanadate solution.

Turning now to the drawings, and initially to FIG. 1, there is shown a cross flow absorber/oxidizer process, and apparatus generally designated by reference numeral 10. The apparatus 10 includes a liquid flow control ball valve 12 disposed in a conduit 14 and a reaction chamber 15 disposed between a first gas/liquid mass transfer zone, or absorber chamber, generally designated 16, and a second gas/liquid mass transfer zone, or oxidizer chamber, generally designated 18. The oxidizer chamber 18 includes three separated oxidation stages 18A, 18B and 18C, for removal of hydrogen sulfide (as HS⁻ and S⁼) from a process gas. The reaction chamber 15 is disposed between and in fluid communication with both the first mass transfer zone, or absorber chamber 16, via conduit 14 and the second mass transfer zone, or oxidizer zone 18.

In one embodiment of the present invention, the small amount of polyvalent metal redox solution (sub-stoichiometric) in the absorber 16 can be achieved by recirculating redox solution from the oxidizer 18, e.g., from the last oxidizer stage 18C, through conduit 19 and valve 21, back to the reaction chamber 15, before the redox solution reaches the absorber 16.

The absorber chamber 16 is connected in fluid communication through the reaction chamber 15 to the first stage 18A of the oxidizer zone 18 via cross conduit 14. H₂S is introduced at the bottom of the absorber through sparger 22 in the absorber chamber 16 for intimate contact with liquid ferric iron chelate solution or liquid vanadium (Stretford process) solution 29. The H₂S rises along with oxidized catalyst solution from the third or last stage 18C of oxidizer zone 18 to absorption zone 16 and, after the oxidized catalyst solution has absorbed H₂S from the process gas in absorption zone 16, the H₂S-laden liquid catalyst solution flows over the baffle 30 separating the absorber chamber 16 from the cross flow conduit 14, through ball valve 12, to the reaction chamber 15, and then flows to the first oxidizer stage 18A.

The hydrogen sulfide from the process gas is absorbed by the polyvalent metal redox solution in absorber 16 and because of the sub-stoichiometric quantity of polyvalent metal redox solution, flows through crossflow conduit 14 to reaction chamber 15 before any substantial quantity of sulfur is precipitated in the reaction chamber 15. Sulfur and polyvalent metal redox solution flow by gravity through conduit 64 into an external sulfur settler vessel 66, where sulfur solids settle and are removed through bottom sulfur conduit 68. The recovered sulfur and a small quantity of polyvalent metal redox solution are pumped by slurry pump 70 to a sulfur recovery apparatus, such as a melter (not shown) for separating molten sulfur from the polyvalent metal redox solution.

The polyvalent metal redox solution separated from the settled sulfur in settler 66 is pumped through conduits 72 and 74 by pump 76 either back into the reaction chamber, or into the first oxidation stage 18A, as shown in FIG. 1.

The H₂S-laden liquid catalyst in the first oxidizer stage 18A is oxidized by air flowing through sparger 36 and flows over baffle 38 and under baffle 40 to the second stage 18B of oxidizer 18. The partially oxidized solution in the second stage 18B is further oxidized by air flowing through sparger 42 and flows over baffle 44 and under baffle 46 to the third stage 18C of oxidizer 18, for further oxidation with air from sparger 47. From the third oxidation stage 18C, the catalyst flows over baffle 48, and under baffle 50 to the absorber chamber 16.

Spent oxidation air is vented from the top of each oxidizer stage 18A, 18B and 18C through outlet conduits and can be maintained separately. Also, an overhead space 59 above absorber 16 preferably is flushed with air and the overhead space vented through outlet 28. All vented gases can be treated prior to release to the atmosphere.

The liquid flow control using the valve 12 and reaction chamber 15 was found to be a marked improvement over attempts to control liquid flow using only control of air flow through the air spargers 36, 42 and 47.

The air spargers 36, 42 and 47 in each of the three oxidizer stages 18A, 18B and 18C of the oxidizer zone 18 were formed from slit and plugged silicone rubber oxidizer hoses attached to a capped one inch internal diameter pipe disposed along the bottom of each oxidizer stage 18A, 18B and 18C. Later, the slit hoses were removed and replaced by cloth diffusers.

Figure 2:
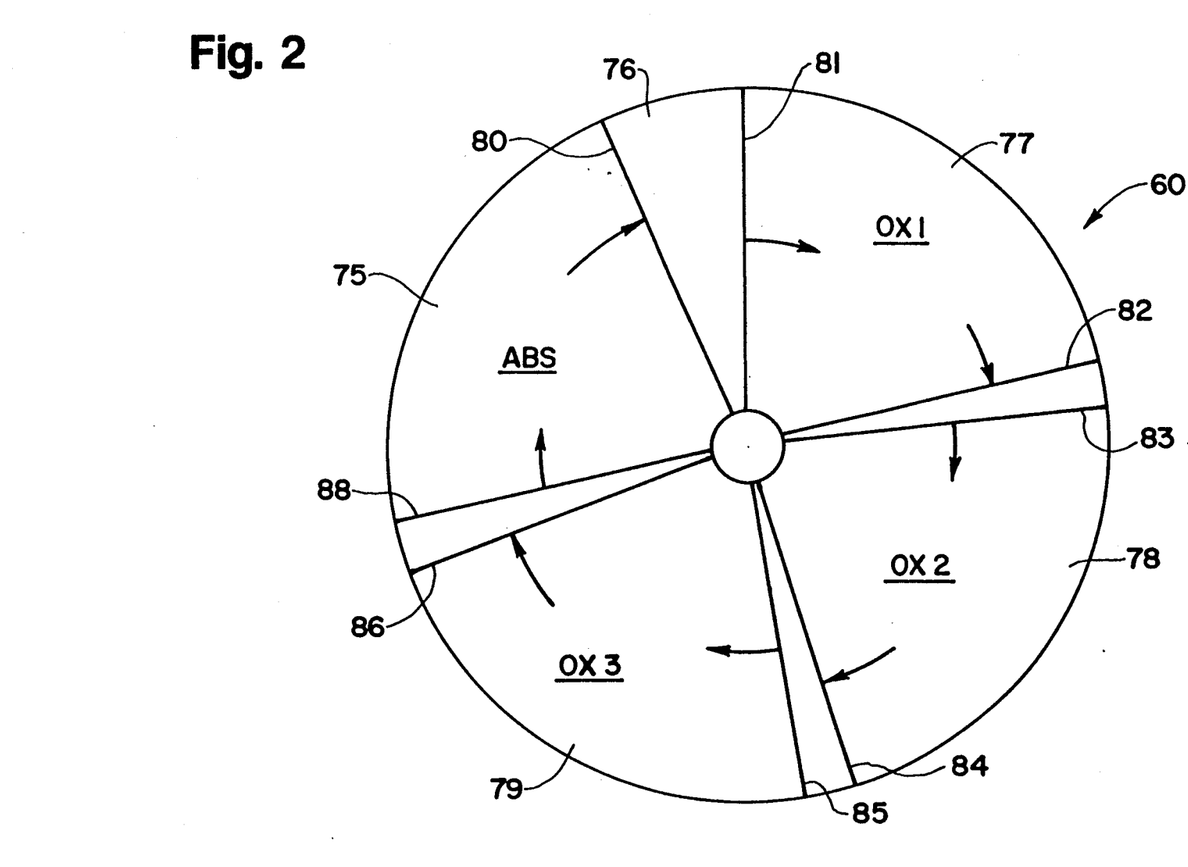
FIG. 2 is a schematic top view of another embodiment of the oxidizer/absorber mass transfer vessel, for use in the method and apparatus of FIG. 1, as a circular design.

The circular design of the process and apparatus shown in FIG. 2, generally designated 60, includes an absorber chamber 75, a reaction chamber 76 and an oxidizer chamber that is divided into three gas-separated stages, 76, 78 and 79. Horizontally and vertically spaced baffles 80 and 81, disposed between the absorber chamber 75 and the first oxidation stage 77 define the reaction chamber 76, therebetween, for crystallization of sulfur from the H₂S-laden polyvalent metal redox solution prior to oxidation of the redox solution.

The dimensions of the reaction chamber 76 can be enlarged as desired to provide any desired residence time prior to oxidation of the redox solution in the first oxidizer stage 77. Similarly, horizontally and vertically spaced baffles 82 and 83 are disposed between the first and second oxidizer stages 77 and 78; horizontally and vertically spaced baffles 84 and 85 are disposed between the second and third oxidizer stages 78 and 79; and horizontally and vertically spaced baffles 86 and 88 are disposed between the third oxidizer stage 79 and the absorber chamber 75. The spaced baffles 80 and 81; 82 and 83; 84 and 85; and 86 and 88 are constructed like those shown in FIG. 1 such that liquid from the absorber flows over baffle 80 and under baffle 82, and liquid from each successive oxidizer stage flows over its adjacent baffle 82, 84 and 86, and under the baffle 83, 85 or 88 adjacent the next succeeding zone. Like FIG. 1, the baffle that the liquid flows under prevents fluid communication above the liquid level between adjacent zones. Although not shown in FIG. 2, air spargers are disposed in oxidizer stages 77, 78 and 79, and a process gas sparger is disposed in absorber chamber 75. Preferably, the cylindrical absorber/oxidizer vessel shown in FIG. 2 has a planar, horizontally disposed floor.

Figure 3:
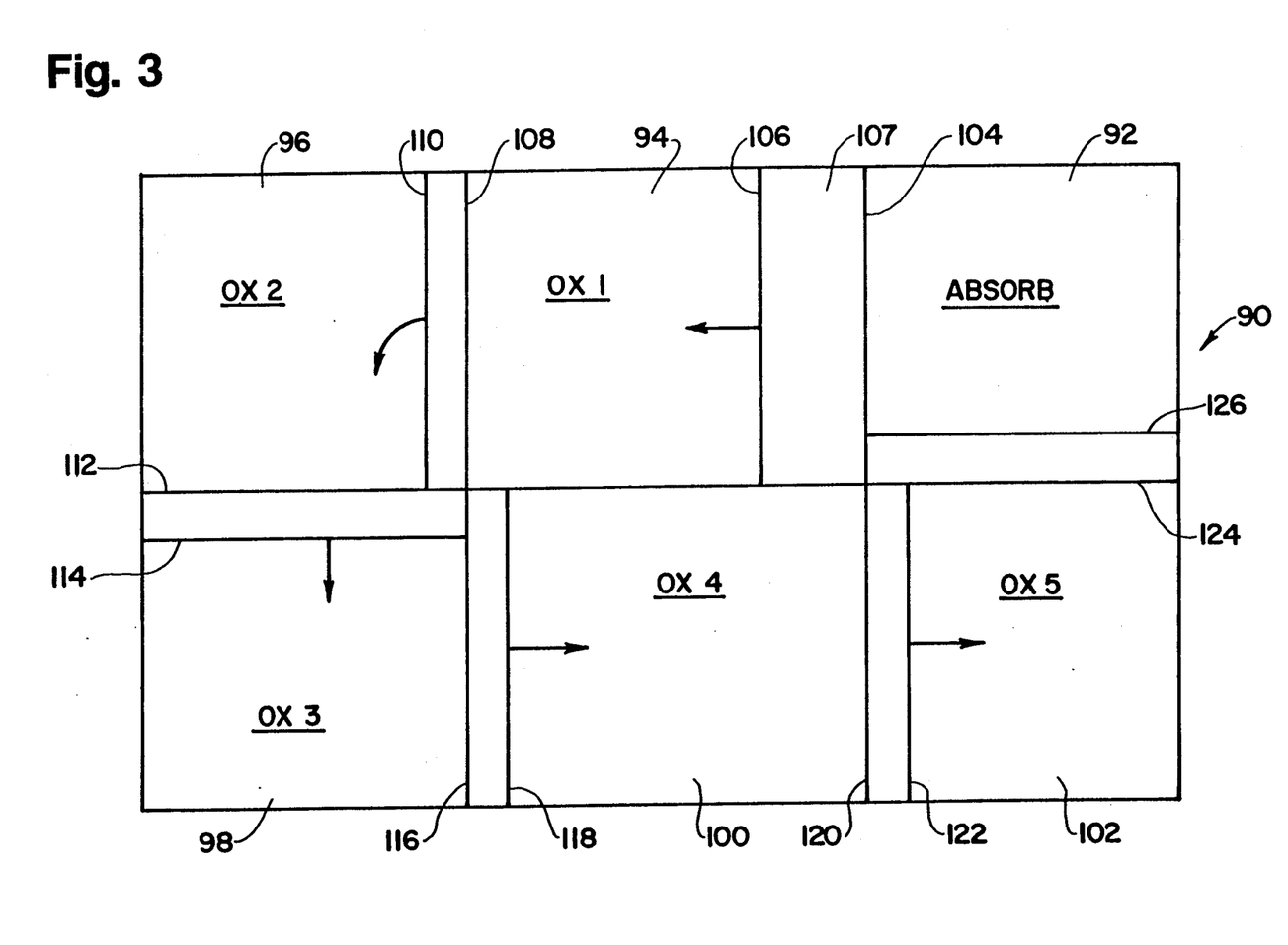
FIG. 3 is a schematic top view of another embodiment of the oxidizer/absorber mass transfer vessel, for use in the method and apparatus of FIG. 1, as an alternative rectangular design providing additional oxidation stages.

The absorber/oxidizer vessel construction of FIG. 3, generally designated 90, is an enlarged version of that shown in FIG. 1 that provides additional oxidizer zones, and includes an absorber chamber 92 and a total of five oxidizer zones, 94, 96, 98, 100 and 102. Vertically and horizontally spaced baffles 104 and 106 separate absorber chamber 92 from the first oxidizer stage 94 and define a reaction chamber 107 therebetween. Reduced polyvalent metal redox solution from absorber 92 flows over baffle 104 into reaction chamber 107 and under baffle 106 into the first oxidizer stage 94. Baffle 106 prevents fluid communication above the liquid level between absorber chamber 92 and the first oxidizer stage 94. Similarly, horizontally and vertically spaced baffles 108 and 110; 112 and 114; 116 and 118; and 120 and 122 are constructed like those of FIG. 1 to prevent fluid communication above the liquid level between adjacent zones and to allow liquid from one zone or chamber to flow over its adjacent baffle 104, 108, 112, 116, 120 and 124, and under the baffle 106, 110, 114, 118, 122 or 126 adjacent the next succeeding zone. Although not shown in FIG. 3, air spargers are disposed in oxidizer stages 94, 96, 98, 100 and 102, and a process gas sparger is disposed in absorber chamber 92, the same as the spargers shown in FIG. 1.

It should be understood that the present disclosure has been made only by way of preferred embodiments and that numerous changes in details or construction, combination and arrangement of parts and process steps can be resorted to without departing from the spirit and scope of the invention as hereunder claimed.

What is claimed is:

1. In a continuous process for intimate contact of a polyvalent metal redox solution sequentially with a process gas and a second gas in a vessel including a first mass transfer zone and a second mass transfer zone laterally spaced and in liquid communication, with said mass transfer zones being in liquid flow communication, with an upper end of one mass transfer zone in fluid communication with a lower end of a succeeding mass transfer zone and containing a level of polyvalent metal redox solution in each mass transfer zone, such that polyvalent metal redox solution is introduced into the first mass transfer zone near a lower end and flows through the first mass transfer zone in intimate contact with the process gas, and the polyvalent metal redox solution flows from the first mass transfer zone, into the second mass transfer zone for intimate contact with the second gas in the second mass transfer zone, said liquid reagent flowing through the second mass transfer zone in intimate contact with the second gas and flowing out of the second mass transfer zone through a liquid reagent outlet and including means for separating gases present in one mass transfer zone from gases present in the other mass transfer zone, the improvement comprising:

introducing the process gas into said first mass transfer zone, in cocurrent flow with the polyvalent metal redox solution maintained at a pH of at least 7, for intimate contact with and absorption of a component of the process gas into the polyvalent metal redox solution said first mass transfer zone including one or more mass transfer stages in sequential liquid flow communication, with said first mass transfer zone in fluid communication with a residence chamber disposed within said vessel, wherein essentially no additional gas is dispersed in the liquid within the residence chamber;

introducing the second gas into said second mass transfer zone, in cocurrent flow with polyvalent metal redox solution for intimate contact and mass transfer with said polyvalent metal redox solution after said polyvalent metal redox solution has been intimately contacted and mass transferred with the process gas in the first mass transfer zone, said second mass transfer zone including one or more mass transfer stages in liquid flow communication, with an upper end of the second mass transfer zone in fluid communication with a lower end of the first mass transfer zone through an intermediate flow channel wherein essentially no additional gas is dispersed in the liquid within the intermediate flow channel; and continuously flowing, in a controlled flow, polyvalent metal redox solution in a less than stoichiometric quantity required for absorption of said component from said process gas in said first mass transfer zone from said first mass transfer zone into said residence chamber, where essentially no additional gas is introduced, to provide a residence time for the polyvalent metal redox solution between the first and second mass transfer zones, between contact of the polyvalent metal redox solution with said two gases, in a continuous process.

2. The process as defined in claim 1 wherein the liquid reagent is a catalytic polyvalent metal redox solution, and wherein the process gas is an $H_2S$-containing gas, and wherein the second gas is an oxygen-containing gas.

3. The method of claim 2 further including the step of removing elemental sulfur from the second mass transfer zone together with some polyvalent metal redox solution and separating the sulfur from the polyvalent metal redox solution.

4. The method of claim 2 wherein the process gas further includes a cyanide gas.

5. The method of claim 2 wherein the catalytic solution is a ferric iron chelate solution that is reduced by hydrogen sulfide gas to a ferrous iron chelate solution in said first mass transfer zone.

6. The method of claim 1 including the step of introducing the liquid reagent from the outlet of the second mass transfer zone into the reaction chamber for retaining a continuous supply of the liquid reagent between the first mass transfer zone and the second mass transfer zone, and continuously flowing the liquid reagent from the reaction chamber to the second mass transfer zone at a variable, controlled rate.

7. The method of claim 1 wherein there is essentially no gas dispersed through the liquid reagent in the reaction chamber, except for the first and second gases dissolved in the liquid reagent in the first and second mass transfer zones.

8. The method of claim 1 wherein the second mass transfer zone includes a plurality of mass transfer stages in open liquid communication, one with another, and further including introducing the second gas into a first stage of the second mass transfer zone in contact with said liquid reagent; and thereafter contacting the liquid reagent received from the first stage of the second mass transfer zone with the second gas in a second stage of the second mass transfer zone.

9. A method of contacting a polyvalent metal redox solution with different gases sequentially in separate mass transfer zones within a single vessel, said mass transfer zones operatively connected in liquid communication with each other comprising:

intimately contacting the polyvalent metal redox solution with a process gas in a first mass transfer zone, said polyvalent metal redox solution maintained at a pH of at least 7, and said process gas flowing cocurrently in said first mass transfer zone to effect mass transfer between said polyvalent metal redox solution and said process gas, thereby forming a treated gas and a less active polyvalent metal redox solution;

introducing the less active polyvalent metal redox solution a reaction chamber such that the density of the material in the residence chamber is greater than the density of the material in a second mass transfer zone;

flowing the less active polyvalent metal redox solution from the reaction chamber to the second mass transfer zone;

introducing a second gas, different from said process gas, into said second mass transfer zone in cocurrent flow with the less active polyvalent metal redox solution, thereby effecting mass transfer between said less active polyvalent metal redox solution and said second gas to form a regenerated, active polyvalent metal redox solution in the concentration and flow rate of polyvalent metal redox solution in the first mass transfer zone in relation to the flow rate and concentration of $H_2S$ in said process gas within said first mass transfer zone is such that the polyvalent metal redox solution is less than the stoichiometric quantity needed for reaction with all of the $H_2S$ in the process gas in said first mass transfer zone.

10. The method of claim 9 wherein the process gas includes a hydrogen sulfide gas contaminant and said liquid reagent is a reducible catalytic oxidation-reduction solution, thereby effecting reduction of the catalytic solution in said first mass transfer zone, to form a reduced catalytic solution and to effect oxidation of the hydrogen sulfide gas, and wherein the second gas is capable of oxidizing the reduced catalytic solution so that the oxidized catalytic solution is capable of further oxidation of the process gas in the first mass transfer zone, to form elemental sulfur.

11. The method of claim 10 wherein the catalytic solution is a ferric iron solution that is reduced by hydrogen-sulfide gas in said first mass transfer zone to a ferrous iron solution.

12. The method of claim 9 wherein there is essentially no gas dispersed through the liquid reagent in the reaction chamber, except for gases dissolved in the liquid reagent in the first and second mass transfer zones.

13. The method of claim 9 wherein the second mass transfer zone includes a plurality of mass transfer stages in open liquid communication, one with another, and further including introducing the second gas into a first stage of the second mass transfer zone in contact with said less active liquid reagent to form a partially active liquid reagent; and contacting the partially active liquid reagent received from the first stage of said second mass transfer zone with the second gas in a second stage of the second mass transfer zone.

14. A method of contacting a liquid with different gases sequentially in separate mass transfer zones, said mass transfer zones operatively connected in liquid communication with each other, comprising:

intimately contacting a catalytic polyvalent metal redox solution with a process gas in a first mass transfer zone, said polyvalent metal redox solution and said process gas flowing cocurrently in said first mass transfer zone to effect mass transfer between said polyvalent metal redox solution and said process gas, thereby forming a treated gas and a reduced polyvalent metal redox solution;

introducing the reduced polyvalent metal redox solution into a second mass transfer zone for intimate contact with a second gas, different from said process gas, in cocurrent flow with the reduced polyvalent metal redox solution, thereby effecting mass transfer between said reduced polyvalent metal redox solution and said second gas to form a regenerated catalytic polyvalent metal redox solution; and controlling the concentration and flow rate of liquid reagent from the second mass transfer zone into the first mass transfer zone in relation to the flow rate and concentration of $H_2S$ in said process gas within said first mass transfer zone such that the polyvalent metal redox solution is less than the stoichiometric quantity needed for reaction with all of the $H_2S$ in the process gas.

15. Apparatus for effecting mass transfer of a liquid reagent sequentially with two different gases in a separate mass transfer zone for each gas without permitting both gases to contact the same portion of the liquid simultaneously, comprising:

a first mass transfer zone for intimate contact and mass transfer between the liquid reagent and a first gas in cocurrent flow;

means for directing the liquid reagent and the first gas into the first mass transfer zone in cocurrent flow to form a treated gas and a reacted liquid reagent;

a second mass transfer zone including a plurality of mass transfer stages sequentially arranged, each stage spaced by a quiescent flow channel adapted to direct liquid from an upper portion of one mass transfer stage to a lower portion of a succeeding mass transfer stage of said second mass transfer zone, said second mass transfer zone being in liquid, but not vapor, communication with the first mass transfer zone;

means for directing the reacted liquid reagent from the first mass transfer zone into the second mass transfer zone;

means for directing a second gas into the second mass transfer zone in cocurrent flow with the reacted liquid reagent for intimate contact and mass transfer therebetween, said first and second mass transfer zones disposed in a single mass transfer vessel including baffle means defining said quiescent flow channels and for separating the mass transfer zones to prevent gas from the second mass transfer zone from contacting reacted liquid reagent in the first mass transfer zone; and means operatively connected between the first mass transfer zone and the second mass transfer zone for varying the flow rate of reacted liquid reagent from the first mass transfer zone to the second mass transfer zone, while maintaining continuous operation of both mass transfer zones in a single vessel.

16. The apparatus of claim 15 wherein the means for separating the mass transfer zones comprises two spaced, overlapping vertical baffles overlapping within the liquid reagent to allow liquid reagent flow between the mass transfer zones while preventing gas introduced into the first mass transfer zone from entering the second mass transfer zone.

17. The apparatus of claim 15 wherein the means for varying the liquid reagent flow from the first mass transfer zone to the second mass transfer zone includes a reaction chamber disposed adjacent the second mass transfer zone for retaining a supply of reacted liquid reagent to permit periodic adjustment of flow rate of the reacted liquid reagent to the second mass transfer zone, while maintaining a continuous flow of liquid reagent continuously through said first and second mass transfer zones in a single vessel.

18. The apparatus of claim 17 further including a conduit operatively connected between the first mass transfer zone and the reaction chamber, said first mass transfer zone being in liquid communication with both the reaction chamber and the second mass transfer zone, said conduit including a valve adapted to adjust the flow of said reacted liquid reagent from said first mass transfer zone to the reaction chamber.

19. The apparatus of claim 18 wherein the reaction chamber includes a sulfur outlet for recovering elemental sulfur therefrom, and the second mass transfer zone includes a liquid inlet for receiving liquid reagent separated from the sulfur.

20. The apparatus of claim 15 further including a plurality of stages of said second mass transfer zone in liquid communication, one with the other, for effecting mass transfer between said liquid reagent and said second gas.

21. In a continuous process for intimate contact of a polyvalent metal redox solution sequentially with a process gas and a second gas in a vessel including a first mass transfer zone and a second mass transfer zone laterally spaced and in liquid communication, with said mass transfer zones being in liquid flow communication, with an upper end of one mass transfer zone in fluid communication with a lower end of a succeeding mass transfer zone and containing a level of polyvalent metal redox solution in each mass transfer zone, such that polyvalent metal redox solution is introduced into the first mass transfer zone and flows through the first mass transfer zone in intimate contact with the process gas, and the polyvalent metal redox solution flows from the first mass transfer zone, into the second mass transfer zone for intimate contact with the second gas in the second mass transfer zone, said polyvalent metal redox solution flowing through the second mass transfer zone in intimate contact with the second gas and flowing out of the second mass transfer zone through a polyvalent metal redox solution outlet and including means for separating gases present in one mass transfer zone from gases present in the other mass transfer zone, the improvement comprising:

introducing the process gas into said first mass transfer zone, in concurrent flow with the polyvalent metal redox solution maintained at a pH of at least 7, for intimate contact with and absorption of a component of the process gas into the polyvalent metal redox solution, said first mass transfer zone in fluid communication with a residence chamber disposed within said vessel, wherein essentially no additional gas is dispersed in the liquid within the residence chamber;

introducing the second gas into said second mass transfer zone, in cocurrent flow with polyvalent metal redox solution, for intimate contact and mass transfer with said liquid reagent after said liquid reagent has been intimately contacted and mass transferred with the process gas in the first mass transfer zone, said second mass transfer zone including one or more mass transfer stages in liquid flow communication, with an upper end of said second mass transfer zone in fluid communication with a lower end of the first mass transfer zone through an intermediate flow channel wherein essentially no additional gas is dispersed in the lqiuid within the intermediate flow channel; and continuously flowing, in a controlled flow, a portion of the polyvalent metal redox solution in a less than stoichiometric quantity required for absorption of said component from said gas in said first mass transfer zone from said second mass transfer zone into said residence chamber, thereby by-passing the first mass transfer zone; and continuously flowing a portion of the polyvalent metal redox solution, in a controlled flow, from the second mass transfer zone to the first mass transfer zone and from the first mass transfer zone to the residence chamber to provide a residence time for the polyvalent metal redox solution between the first and second mass transfer zones in a continuous process.

* * * * *